United States Patent [19]

Auphan et al.

[11] 4,324,142

[45] Apr. 13, 1982

[54] CIRCUIT FOR PROCESSING THE SIGNALS RECEIVED BY A MOSAIC OF ULTRASONIC TRANSDUCERS IN B-MODE ECHOGRAPHY

[75] Inventors: Michel J. Auphan, Paris, France; Ludo C. J. Baghuis, Eindhoven, Netherlands

[73] Assignee: U.S. Philips Corporation, New York, N.Y.

[21] Appl. No.: 164,662

[22] Filed: Jun. 30, 1980

[30] Foreign Application Priority Data

Jul. 4, 1979 [FR] France ................... 79 17379

[51] Int. Cl.³ .................................... G01N 29/04
[52] U.S. Cl. .................................... 73/626
[58] Field of Search ............... 73/626; 128/660; 367/105

[56] References Cited

U.S. PATENT DOCUMENTS 4,112,411  9/1978  Alais et al. ................... 73/626

4,131,023  12/1978  Mezrich et al. ................ 73/626

Primary Examiner—Anthony V. Ciarlante
Attorney, Agent, or Firm—Jack E. Haken

[57] ABSTRACT

A processing circuit is connected to the output of a mosaic which consists of n first electrodes on a first principal surface of a TGS plate and 2p second electrodes on the second principal surface thereof. The circuit is constructed so that the output connections of the second electrodes are grouped in p resultant groups which are connected, via p paths which each comprise an amplifier and a variable delay line, to the inputs of a first adder. The output of the first adder is connected, via a network of (q-1) delay lines having a fixed delay time, to the inputs of q parallel variable delay lines which are connected in parallel and which are connected to the inputs of a second adder. The delay times thus realized are controlled so that a first ultrasonic lens and a second ultrasonic lens are successively formed.

2 Claims, 1 Drawing Figure

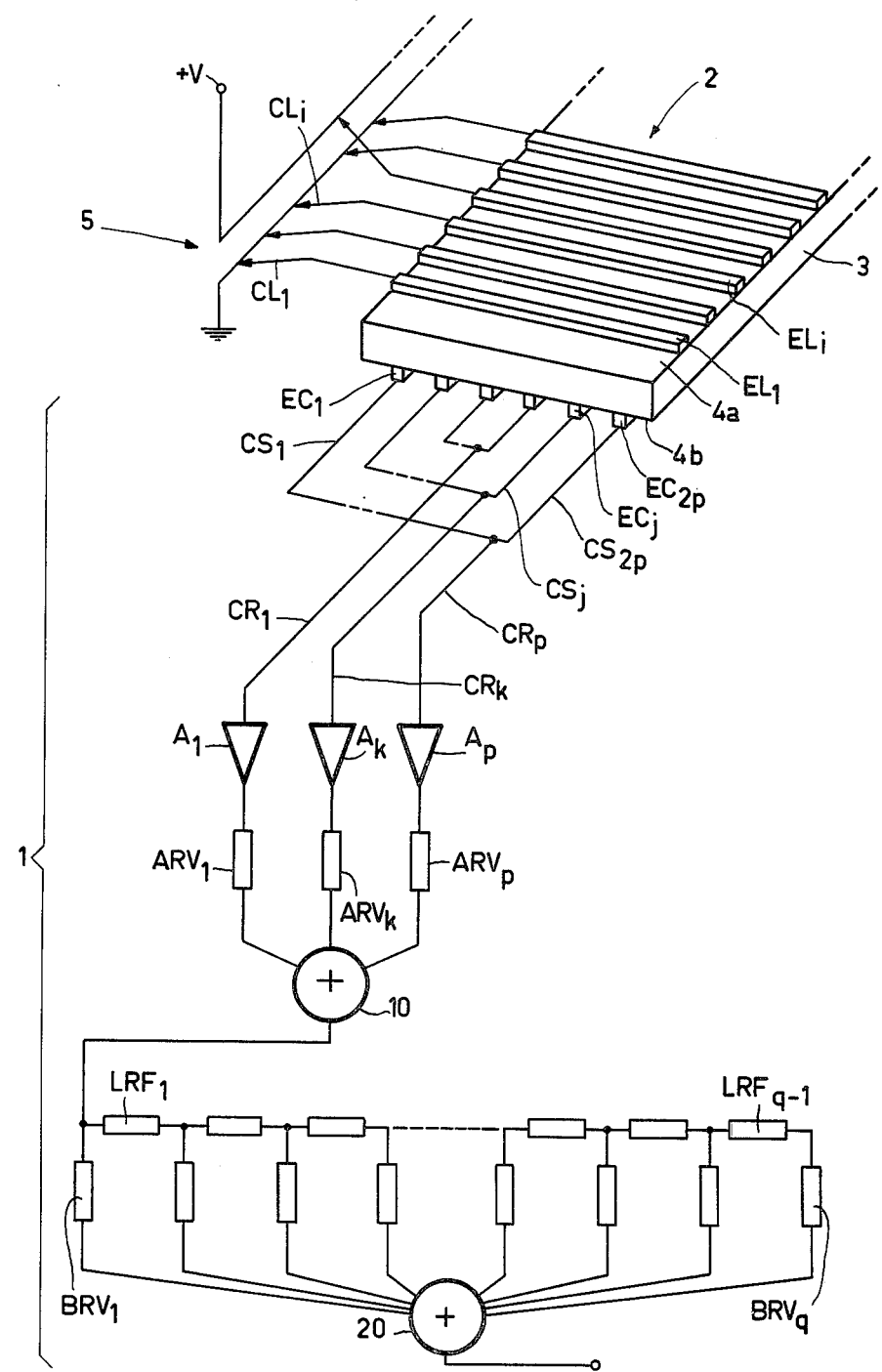

CIRCUIT FOR PROCESSING THE SIGNALS RECEIVED BY A MOSAIC OF ULTRASONIC TRANSDUCERS IN B-MODE ECHOGRAPHY

The invention relates to a circuit for processing echo signals which are produced, in reaction to a series of emitted ultrasonic pulses, by a mosaic of electrostrictive ultrasonic transducers. The mosaic is formed by n first electrodes which can be polarized independently of each other arranged in parallel lines on one of the principal surfaces of a plate of an electrostrictive material and by 2p second electrodes, each of which is connected to an output connection, arranged in a configuration of parallel lines which extend perpendicularly to the fist n lines.

Ultrasound echography examination systems utilizing a mosaic of ultrasonic transducers which are distributed over a number of rows and columns of a matrix are known and have been used for many years (see notably French Patent Application No. 7,537,929) (U.S. Pat. No. 4,112,411). It is also known that the manufacture of the mosaic is much simpler when an electrostrictive material, that is a material which supplies a signal only if it is prepolarized, is used for manufacturing the mosaic. When n indicates the number of lines and p indicates the number of columns of the mosaic, and when only one line is polarized at a time, it is sufficient to use (n+p) connection wires for receiving (nxp) different signals. Each column then receives the signal which corresponds to the transducer situated at the intersection of this column and the polarized line. Successive polarization of the n lines thus enables reading of all transducers of the mosaic.

In said French Patent Application triglycine sulphate (TGS) is mentioned as an electrostrictive material which is suitable for realizing the mosaic.

The processing of the signals obtained by means of an ultrasound echography apparatus is usually performed by a computer which enables either synthetic focusing of signals progressively stored in a memory by the computer or a reconstruction of the image by means of one of the available reconstruction algorithms. However, the execution of this method requires a comparatively large amount of time, so it is not very suitable for echographic examinations where the result must be immediately available, for example, examination of a live foetus or a beating heart.

SUMMARY OF THE INVENTION

The invention has for its object to provide a circuit for processing the signals which originate from a mosaic of electrostrictive ultrasonic transducers during a B-mode echographic examination which allows a variable focus image to be quickly obtained.

To this end, the invention is characterized in that the output connections are symmetrically and pair-wise interconnected. The p-connections thus obtained are connected, via p-separate paths which each include an amplifier and a variable delay line, to the inputs of a first adder. The output of the first adder is connected, via a network of (q−1) delay lines, to the relevant inputs of q parallel variable delay lines. The outputs of the delay lines are connected to the relevant q inputs of a second adder.

The delay times of the variable delay lines connected to the inputs of the first and the second adders are controlled so that these delay lines form the electrical equivalent of a first cylindrical ultrasonic lens and a second cylindrical ultrasonic lens, the axes of which extend parallel to the second and the first electrodes, respectively, and whose focal distance increases. The signal supplied by the second adder then corresponds to a B-mode focused echography signal.

BRIEF DESCRIPTION OF THE DRAWING

The invention will be described in detail hereinafter with reference to the accompanying diagrammatic drawing which so shows a signal processing circuit in accordance with the invention.

THE PREFERRED EMBODIMENT

The circuit 1 shown in the drawing is intended for use in an ultrasound echography system incorporating two-dimensional focusing and is arranged at the output of a mosaic 2 of electrostrictive ultrasonic transducers. The active material of the transducers, for example, consists of a rectangular plate 3 of triglycine sulphate (TGS). It supports a set of n parallel first electrodes $EL_1...El_i,...EL_n$ on one of its principal surfaces 4a. Each electrode can be independently connected to a polarization circuit 5 by means of a switch $CL_1$ to $CL_n$ (shown as mechanical interruptors in the FIGURE for the sake of clarity) which is controlled in accordance with a suitable scanning sequence. Each time only one of the switches is closed ($CL_i$, subsequently $CL_{i+1}$, etc.) in a predetermined geometrical order. The second principal surface 4b of the TGS plate 3 supports a set of 2p parallel second electrodes $EC_1,...EC_{2p}$ which extend perpendicular to the electrodes $EL_1$ to $EL_n$. Each second electrode is connected to an output connection $CS_1...CS_{2p}$.

As a result of this configuration, at a given instant the output connection of an arbitrary second electrode $EC_j$ exclusively supplies a signal which is received by the transducer at the intersection of this electrode and the first electrode $EL_i$ which is polarized at this instant.

In accordance with the invention, the output connections $CS_1$ to $CS_{2p}$ of the second electrodes are symmetrically and pair-wise interconnected (i.e. the output connection $CS_1$ is paired to the output connection $CS_{2p}$, the output connection $CS_2$ is paired to the output connection $CS_{2p-1},...$etc.). The p connections $CR_1$ and $CR_p$ thus obtained are connected, via p separate parallel paths which each include an amplifier $A_k$ and a variable delay line $ARV_k$ (k varying from 1 to p), to the p inputs of an adder 10. The output of the adder 10 is connected, via a cascade network of q-1 permanently adjusted delay lines $LRF_1...LRF_q$, to the inputs of q parallel variable delay lines $BRV_1$ to $BRV_q$. The delay time of each delay line $LRF_1$ to $LRF_{q-1}$ in this case equals the reciprocal of the repetition frequency of the which originate from the zone examined and which extend perpendicularly to the mozaic 2 are processed. However, it is alternatively possible for the delay time to have a smaller or larger value in order to process beams having an oblique direction. The outputs of the q delay lines $BRV_1$ to $BRV_q$ are connected to the relevant q inputs of a second adder 20, the output of which supplies the useful signal of the echography system with two-dimensional focusing. Linear scanning of the image is possible thanks to the set of switches $CL_i$. The lines examined are parallel if the ultrasonic repetition period is constant; if this is not the case, the lines examined enclose a given angle with respect to each other and the shape of the zone examined is trapezoidal.

The delay times produced by the delay lines $ARV_1$ to $ARV_p$ are controlled so that the first part of the circuit for processing the ultrasonic signals (i.e. the part present between the output connections $CS_1$ to $CS_{2p}$ and the output of the first adder 10) forms the electrical equivalent and performs the function of a cylindrical ultrasonic lens whose axis extends parallel to the second electrodes. This lens produces focusing of the ultrasonic signals received in one direction with a regularly increasing focal distance in order to receive echos from different depths. This focal distance equals ct/2 if c is the speed of propagation of the sound in the tissues, while t denotes time after the emission. Similarly, the delays produced by the delay lines $BRV_1$ to $BRV_q$ are controlled so that the second part of the circuit for processing the ultrasonic signals (i.e. the part which is situated between the output of the first adder 10 and the output of the adder 20) forms the electrical equivalent and performs the function of a second cylindrical ultrasonic lens whose axis extends parallel to the first electrodes and which produces focusing in the second direction of the ultrasonic signals received with a regularly increasing focal distance (also equal to ct/2).

In B-mode echography, lack of focusing during emission leads to the occurrence of secondary lobes which are more pronounced than in C-mode echography systems. Therefore, in a first embodiment in accordance with the invention, the emitted ultrasonic beam can be directed more precisely by simultaneous emission of a number of transducers; in a second embodiment in accordance with the invention, this can be achieved by suppressing these lobes by the connection of a variable attenuator in series between the output of each variable delay line and the corresponding inputs of the adders. It is alternatively possible to obtain a narrower emitted beam by reserving the TGS plate for the receiving function and by using a plate of, for example, lead zirconium titanate (PZT) which is arranged exactly over the TGS plate for transmission. This PZT plate is narrower than the TGS plate and produces a beam whose dispersion is less.

In a further embodiment in accordance with the invention the circuit has a completely digital construction from the output of the first adder 10. To this end it is sufficient to provide an analog-to-digital converter on the output of this adder. The higher reliability of the digital processing of signal is thus utilized. Moreover, the construction of digital delay lines is simpler than that of analog delay lines.

It is also to be noted that the circuit described above can be used regardless of the electrostrictive material used. Because the Curie temperature of TGS is approximately 49° C. it necessitates the presence of a device for maintaining the material at approximately this temperature and a device for thermal protection of the patent. It may be advantageous either to modify the composition of the triglycine sulphate in order to reduce its Curie temperature to, for example 37° C., or to use other materials whose Curie temperature is approximately equal to the ambient or body temperature.

What is claimed is:

1. A circuit for processing echo signals which are produced, in reaction to a series of emitted ultrasonic pulses, by a mosaic of ultrasonic transducers, the mosaic being formed by n first electrodes which are disposed as parallel lines on a first principal surface of a plate of electrostrictive material and which can be polarized independently of each other and by 2p second electrodes which are disposed as parallel lines which extend perpendicular to the first electrodes, comprising:

p amplifiers each amplifier having an input, which is connected to a symmetrical pair of said second electrodes, and an output;

p first variable delay lines each first delay line having an input, which is connected to the output of a corresponding one of the amplifiers, and an output;

a first adder having p inputs, each of which is connected to an output of a corresponding one of the first delay lines, and an output;

a cascade network of q−1 fixed delay lines, the input of a first delay line in the cascade being connected to the output of the first amplifier;

q second variable delay lines, one of said second variable delay lines having an input connected to the output of the first amplifier and each of the remaining second variable delay lines having an input connected to the output of a corresponding one of the q−1 delay lines in the cascade network; and a second adder having q inputs, each connected to the output of a corresponding one of said second delay lines, and an output which supplies processed echo signals;

the delay times of the first variable delay lines being determined so that the amplifiers, first variable delay lines and the first adder form the electrical equivalent of a first cylindrical ultrasonic lens whose axis extends parallel to the second electrodes and the delay times of the second variable delay lines being controlled so that the fixed delay lines, the second variable delay lines and the second adder form the electrical equivalent of a second cylindrical ultrasonic lens having an axis which extends parallel to the first electrodes.

2. A circuit as claimed in claim 1 for processing echo signals from ultrasonic pulses which are emitted at a constant repetition frequency wherein the delay time of each fixed delay line is equal to the reciprocal of the repetition frequency of the emitted ultrasonic pulses.

* * * * *